US008126098B2

(12) United States Patent
Yang et al.

(10) Patent No.: US 8,126,098 B2
(45) Date of Patent: Feb. 28, 2012

(54) MULTI-RAKE RECEIVER

(75) Inventors: Zhiyu Yang, Sunnyvale, CA (US);
Hongyuan Zhang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 843 days.

(21) Appl. No.: 11/853,421

(22) Filed: Sep. 11, 2007

(65) Prior Publication Data
US 2008/0063034 A1 Mar. 13, 2008

Related U.S. Application Data

(60) Provisional application No. 60/825,356, filed on Sep. 12, 2006.

(51) Int. Cl.
*H04B 1/10* (2006.01)

(52) U.S. Cl. ........ 375/349; 375/147; 375/148; 375/316; 375/324; 375/340; 375/347; 375/348

(58) Field of Classification Search .................. 375/148, 375/349, 147, 316, 324, 340, 347, 348
See application file for complete search history.

(56) References Cited

U.S. PATENT DOCUMENTS

| | | | |
|---|---|---|---|
| 5,563,907 A | 10/1996 | Lomp | |
| 6,621,880 B1 * | 9/2003 | Niesen | 375/340 |
| 6,843,597 B1 | 1/2005 | Li et al. | |
| 6,912,244 B2 * | 6/2005 | Challa et al. | 375/149 |
| 7,106,784 B2 * | 9/2006 | Eltawil et al. | 375/148 |
| 7,161,974 B2 * | 1/2007 | Mehrabani et al. | 375/148 |
| 7,183,949 B2 * | 2/2007 | Park | 341/61 |
| 7,269,205 B2 * | 9/2007 | Wang | 375/148 |
| 7,457,349 B2 * | 11/2008 | Grilli et al. | 375/147 |
| 2003/0053525 A1 | 3/2003 | Mehrabani et al. | |
| 2004/0223539 A1 | 11/2004 | Yang | |
| 2005/0058184 A1 | 3/2005 | Paul et al. | |
| 2006/0050773 A1 * | 3/2006 | Yano | 375/148 |
| 2007/0127556 A1 * | 6/2007 | Sato | 375/148 |

FOREIGN PATENT DOCUMENTS

| | | | |
|---|---|---|---|
| JP | WO2005/076492 | * | 8/2005 |
| WO | WO 2007/127556 | * | 8/2005 |

OTHER PUBLICATIONS

IEEE P802.11g/D8.2, Apr. 2003 (Supplemental to ANSI/IEEE Std 802.11 1999 (Reaff 2003)); IEEE P802.11g/D8.2; DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Sponsor LAN/MAN Standards Committee of the IEEE Computer Society; 69 pages.

(Continued)

*Primary Examiner* — Dhaval Patel

(57) ABSTRACT

A wireless receiver includes M antennas that each receive a wireless signal. N rake receiver modules receive the wireless signals from the M antennas and combine multipath components of the wireless signals. A summing module receives outputs of the N rake receiver modules and combines the outputs to generate an output signal. M and N are integers greater than 1.

49 Claims, 10 Drawing Sheets

OTHER PUBLICATIONS

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band; Sponsor LAN/MAN Standards Committee of the IEEE Computer Society; Approved Sep. 16, 1999; IEEE-SA Standards Board; 91 pages.

IEEE Std 802.11b-1999 (Supplement to ANSI/IEEE Std 802.11 1999 Editions) Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; Sponsor LAN/MAN Standards Committee of the IEEE Computer Society; Approved Sep. 16, 1999; IEEE-SA Standards Board; 96 pages.

Notification of Transmittal of the International Search Report and The Written Opinion of The International Searching Authority, or the Declaration dated Mar. 31, 2008 in reference to PCT/US2007/019779.

* cited by examiner

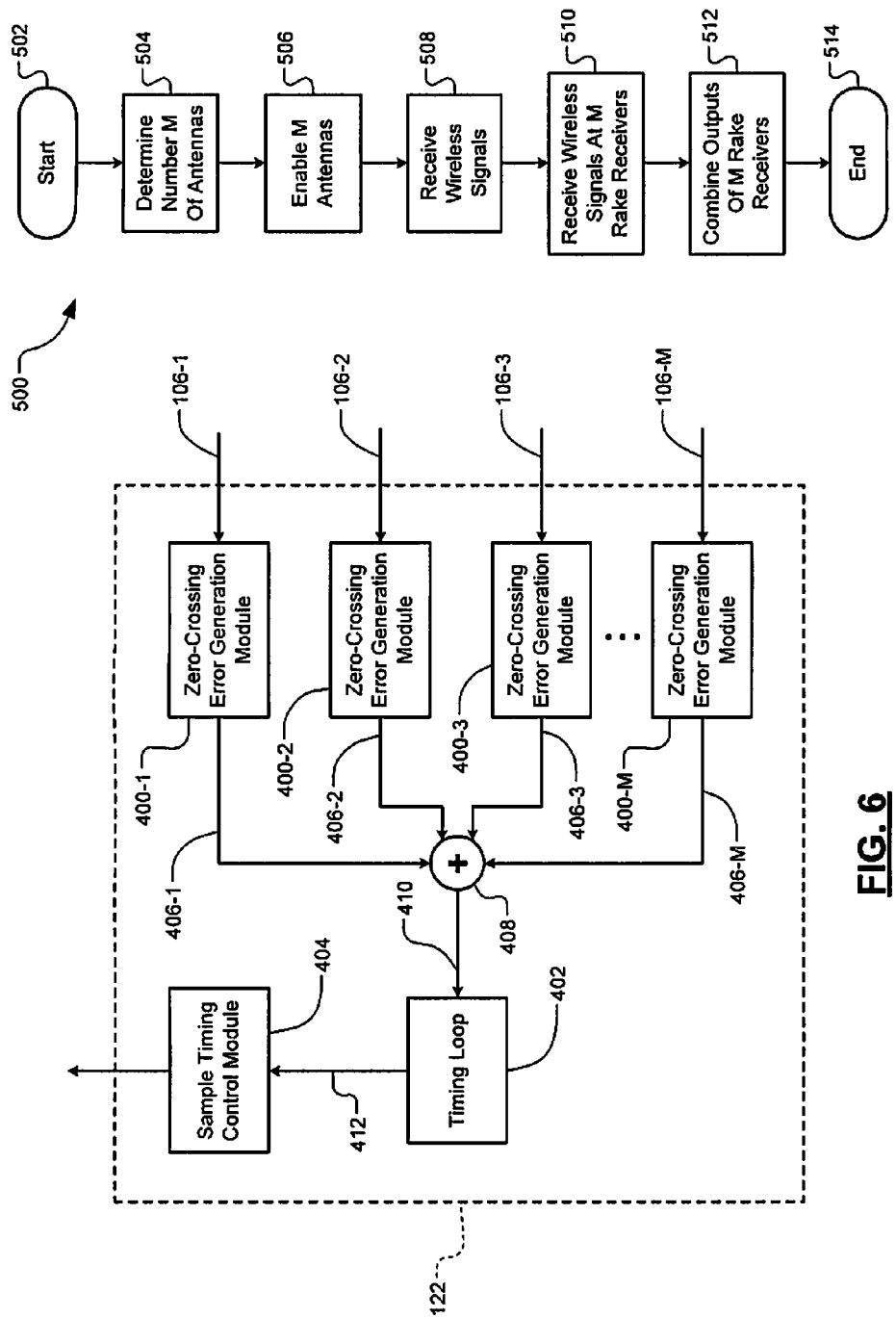

MULTI-RAKE RECEIVER

This application claims the benefit of U.S. Provisional Application No. 60/825,356, filed on Sep. 12, 2006. The disclosure of the above application is incorporated herein by reference in its entirety.

FIELD

The present disclosure relates to wireless receivers, and more particularly to a wireless receiver that includes multiple rake receivers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In wireless communications, a transmitted signal (e.g. radio signals) may be received at a wireless receiver via multiple transmission paths. In other words, the wireless receiver includes an antenna that may receive the same transmitted signal via multiple paths. This tendency to receive the same signal via multiple paths is referred to as "multipath."

Multipath may cause reception errors and decrease quality in wireless communications. For example, multipath may cause intersymbol interference (ISI). A signal received via one of the paths may be out of phase with the same signal received via another one of the paths. Signals that are received in phase with each other result in a stronger signal at the wireless receiver. Conversely, out of phase signals result in a weak or fading signal at the wireless receiver (i.e. result in multipath fading).

Referring now to FIG. 1, a wireless receiver 10 may include a rake receiver 12 to compensate for the effects of multipath fading. A radio frequency (RF) front end module 14 receives a wireless signal 16 from an antenna 18. The rake receiver 12 receives the wireless signal 16 from the front end module 14. The rake receiver 12 decodes each individual path independently and combines the strongest transmission characteristics of each of the paths to generate an output signal 20.

The wireless receiver 10 includes a frequency phase loop module 22 and a timing loop module 24. The frequency phase loop module 22 estimates a frequency offset based on the output signal 20. The timing loop module 24 determines a sampling frequency difference between a wireless transmitter (not shown) and the wireless receiver 10.

Referring now to FIG. 2, the rake receiver 12 includes a plurality of fingers 30-1, 30-2, 30-3, ..., and 30-N (referred to collectively as fingers 30) and a plurality of corresponding delay modules 32-1, 32-2, 32-3, ..., and 32-N (referred to collectively as delay modules 32). The fingers 30 receive multipath signals 34 via a corresponding transmission path. Each of the fingers 30 despreads a corresponding one of the multipath signals 34. The delay modules 32 adjust time offsets of the multipath signals 34. A combining module 36 combines the adjusted multipath signals 34 and generates an output signal 38. The combined output signal 38 may have a higher signal-to-noise ratio than any of the individual multipath signals 34.

SUMMARY

A wireless receiver includes M antennas that each receive a wireless signal. N rake receiver modules receive the wireless signals from the M antennas, and combine multipath components of the wireless signals. A summing module receives outputs of the N rake receiver modules and combines the outputs to generate an output signal. M and N are integers greater than 1.

In other features, each of the N rake receiver modules includes a rake adaptation module that determines rake combining coefficients of a corresponding one of the N rake receiver modules. Each of the N rake receiver modules includes a rake enable module that selectively enables and disables fingers of a corresponding one of the N rake receiver modules based on signal strengths of the fingers. A rake select module receives the wireless signals, that compares signal strengths of the wireless signals to a threshold, and outputs a rake select signal based on the comparison. The rake enable modules selectively enable and disable respective ones of the N rake receiver modules based on the rake select signal.

In other features, a frequency phase loop module determines a frequency offset based on the output signal. A timing loop module that determines a sampling frequency difference between the wireless receiver and a transmitter that transmits the wireless signals. The timing loop module includes N error generation modules that each generate a timing error based on a corresponding one of the wireless signals, a summing module that combines the timing errors to generate a timing error signal, a timing loop that generates a timing correction signal based on the timing error signal, and a sample timing control module that adjusts sampling of the wireless signals based on the timing correction signal.

In other features, N receiver enable modules selectively enable and disable receiver paths of the wireless receiver corresponding to respective ones of the wireless signals. The N receiver enable modules enable M receiver paths and disable N−M receiver paths when M<N. The N receiver enable modules selectively enable and disable the receiver paths based on a receiver select signal. A receiver select module determines a number of the M antennas and generates the receiver select signal based on the number. The receiver select module generates an adjustment signal based on the number. M=N. An adaptive gain control module adjusts a gain of the wireless receiver based on the wireless signals.

A wireless receiver includes M antenna means, each for receiving a wireless signal, N rake receiver means for receiving the wireless signals from the M antenna means, and for combining multipath components of the wireless signals, and summing means for receiving outputs of the N rake receiver means and combining the outputs to generate an output signal. M and N are integers greater than 1.

In other features, each of the N rake receiver means includes rake adaptation means for determining rake combining coefficients of a corresponding one of the N rake receiver means. Each of the N rake receiver means includes rake enable means for selectively enabling and disabling fingers of a corresponding one of the N rake receiver means based on signal strengths of the fingers. The wireless receiver further includes rake select means for receiving the wireless signals, for comparing signal strengths of the wireless signals to a threshold, and for outputting a rake select signal based on the comparison. The rake enable means selectively enable and disable respective ones of the N rake receiver means based on the rake select signal.

In other features, the wireless receiver further includes frequency phase loop means for determining a frequency offset based on the output signal. The wireless receiver further includes timing loop means for determining a sampling frequency difference between the wireless receiver and a transmitter that transmits the wireless signals. The timing loop means includes N error generation means, each for generating a timing error based on a corresponding one of the wireless signals, summing means for combining the timing errors to generate a timing error signal, timing loop means for generating a timing correction signal based on the timing error signal, and sample timing control means for adjusting sampling of the wireless signals based on the timing correction signal.

In other features, the wireless receiver further includes N receiver enable means for selectively enabling and disabling receiver paths of the wireless receiver corresponding to respective ones of the wireless signals. The N receiver enable means enable M receiver paths and disable N−M receiver paths when M<N. The N receiver enable means selectively enable and disable the receiver paths based on a receiver select signal. The wireless receiver further includes receiver select means for determining a number of the M antenna means and for generating the receiver select signal based on the number. The receiver select means generates an adjustment signal based on the number. M=N. The wireless receiver further includes an adaptive gain control means for adjusting a gain of the wireless receiver based on the wireless signals.

A method for operating a wireless receiver includes receiving a wireless signal at each of M antennas, receiving the wireless signals from the M antennas at each of N rake receiver modules, combining multipath components of the wireless signals at the N rake receiver modules, and receiving outputs of the N rake receiver modules and combining the outputs to generate an output signal at a summing module. M and N are integers greater than 1.

In other features, the method further includes determining rake combining coefficients of a corresponding one of the N rake receiver modules. The method further includes selectively enabling and disabling fingers of a corresponding one of the N rake receiver modules based on signal strengths of the fingers. The method further includes comparing signal strengths of the wireless signals to a threshold and outputting a rake select signal based on the comparison. The method further includes selectively enabling and disabling respective ones of the N rake receiver modules based on the rake select signal.

In other features, the method further includes determining a frequency offset based on the output signal. The method further includes determining a sampling frequency difference between the wireless receiver and a transmitter that transmits the wireless signals. The method further includes generating timing errors based on corresponding ones of the wireless signals, combining the timing errors to generate a timing error signal, generating a timing correction signal based on the timing error signal, and adjusting sampling of the wireless signals based on the timing correction signal.

In other features, the method further includes selectively enabling and disabling receiver paths of the wireless receiver corresponding to respective ones of the wireless signals. The method further includes enabling M receiver paths and disabling N−M receiver paths when M<N. The method further includes selectively enabling and disabling the receiver paths based on a receiver select signal. The method further includes determining a number of the M antennas and generating the receiver select signal based on the number. The method further includes generating an adjustment signal based on the number. M=N. The method further includes adjusting a gain of the wireless receiver based on the wireless signals.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a functional block diagram of a timing loop module according to the present disclosure;

FIG. 7 illustrates of a method of operating a wireless receiver according to the present disclosure;

DETAILED DESCRIPTION

Figure 1:
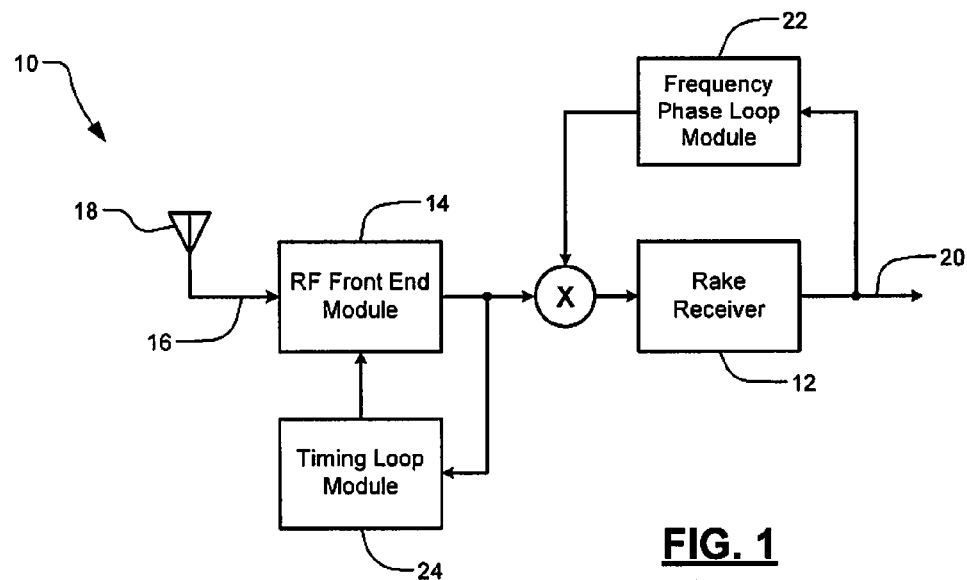
FIG. 1 is a functional block diagram of a wireless receiver that includes a rake receiver according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Typically, a wireless receiver that communicates via a particular communication protocol (for example only, IEEE standard 802.11a, 802.11b, and/or 802.11g) includes a single receive antenna and a corresponding rake receiver that receives transmitted wireless signals. A wireless receiver according to the present disclosure includes multiple receive antennas and corresponding rake receivers that each receive multipath components of a transmitted wireless signal. The wireless receiver spatially combines signals from each of the rake receivers to increase gain and extend a reception range of the wireless receiver.

Figure 3:
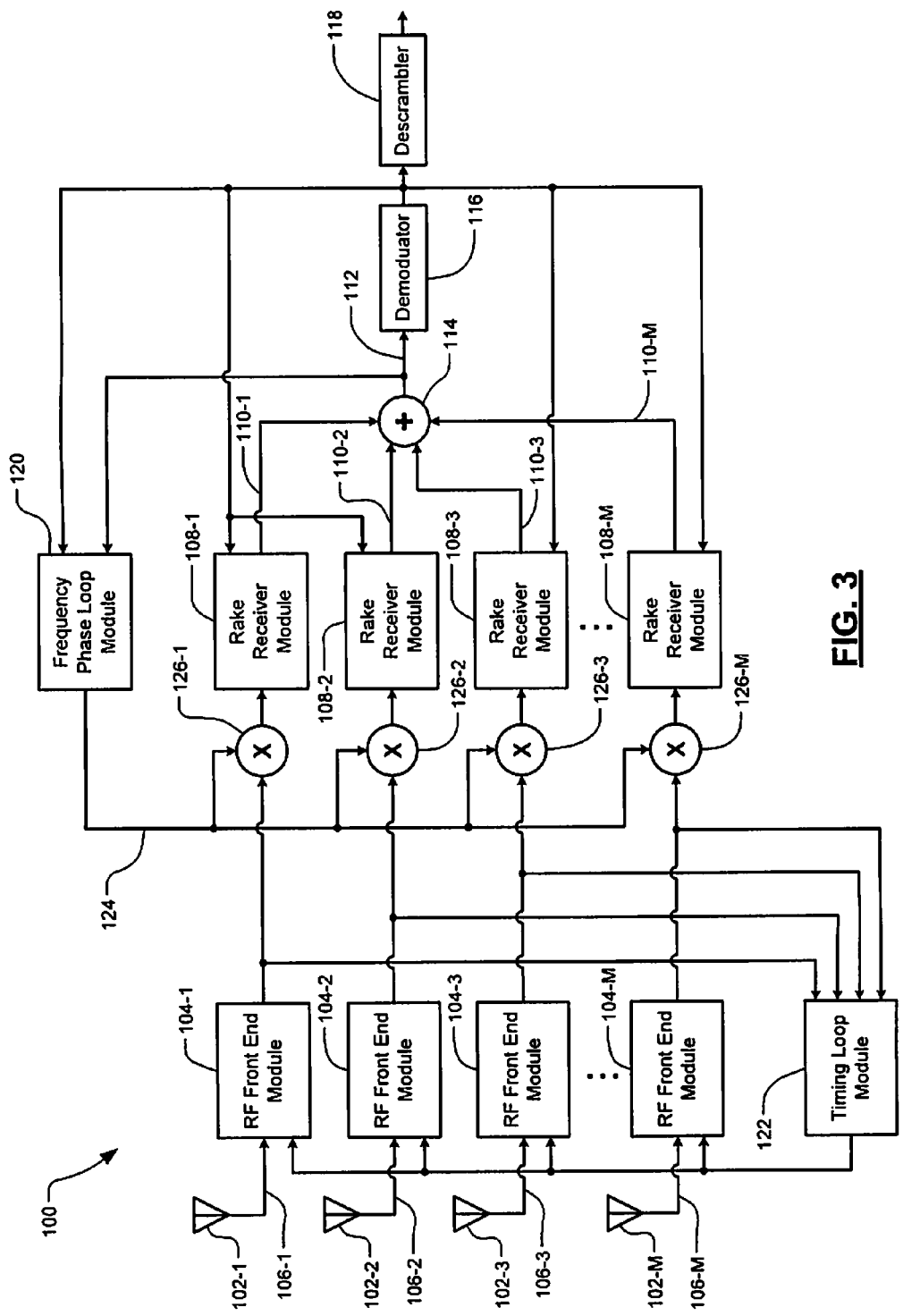
FIG. 3 is a functional block diagram of a wireless receiver that includes multiple rake receiver modules according to the present disclosure.

Referring now to FIG. 3, a wireless receiver 100 includes receive antennas 102-1, 102-2, 102-3, . . . , and 102-M (referred to collectively as multiple receive antennas 102) and corresponding front end modules 104-1, 104-2, 104-3, . . . , and 104-M (referred to collectively as front end modules 104). The antennas 102 and the front end modules 104 receive and process wireless signals 106-1, 106-2, 106-3, . . . , and 106-M (referred to collectively as wireless signals 106). Rake receiver modules 108-1, 108-2, 108-3, . . . , and 108-M (referred to collectively as rake receiver modules 108) each receive corresponding wireless signals 106 from the antennas 102 via the respective front end modules 104.

Each of the rake receiver modules 108 decodes and combines characteristics of one of the corresponding wireless signals 106 to generate rake receiver output signals 110-1, 110-2, 110-3, . . . , and 110-M (referred to collectively as output signals 110). The output signals 110 are combined together to generate an output signal 112. For example, the wireless receiver 100 spatially combines the output signals 110 at a summing module 114 to generate the output signal 112. The output signal 112 is output to a demodulator 116 and a descrambler 118.

The wireless receiver 100 includes a frequency phase loop module 120 and a timing loop module 122. The frequency loop module 120 estimates a frequency offset 124 based on the output signal 112 and compensates each of the wireless signals 106 accordingly. For example, frequency correction multipliers 126-1, 126-2, 126-3, . . . , and 126-M (referred to collectively as frequency correction multipliers 126) receive and multiply the frequency offset 124 and respective ones of the wireless signals 106. The timing loop module 122 receives the wireless signals 106 and determines a sampling frequency difference between a wireless transmitter (not shown) and the wireless receiver 100.

Figure 4:
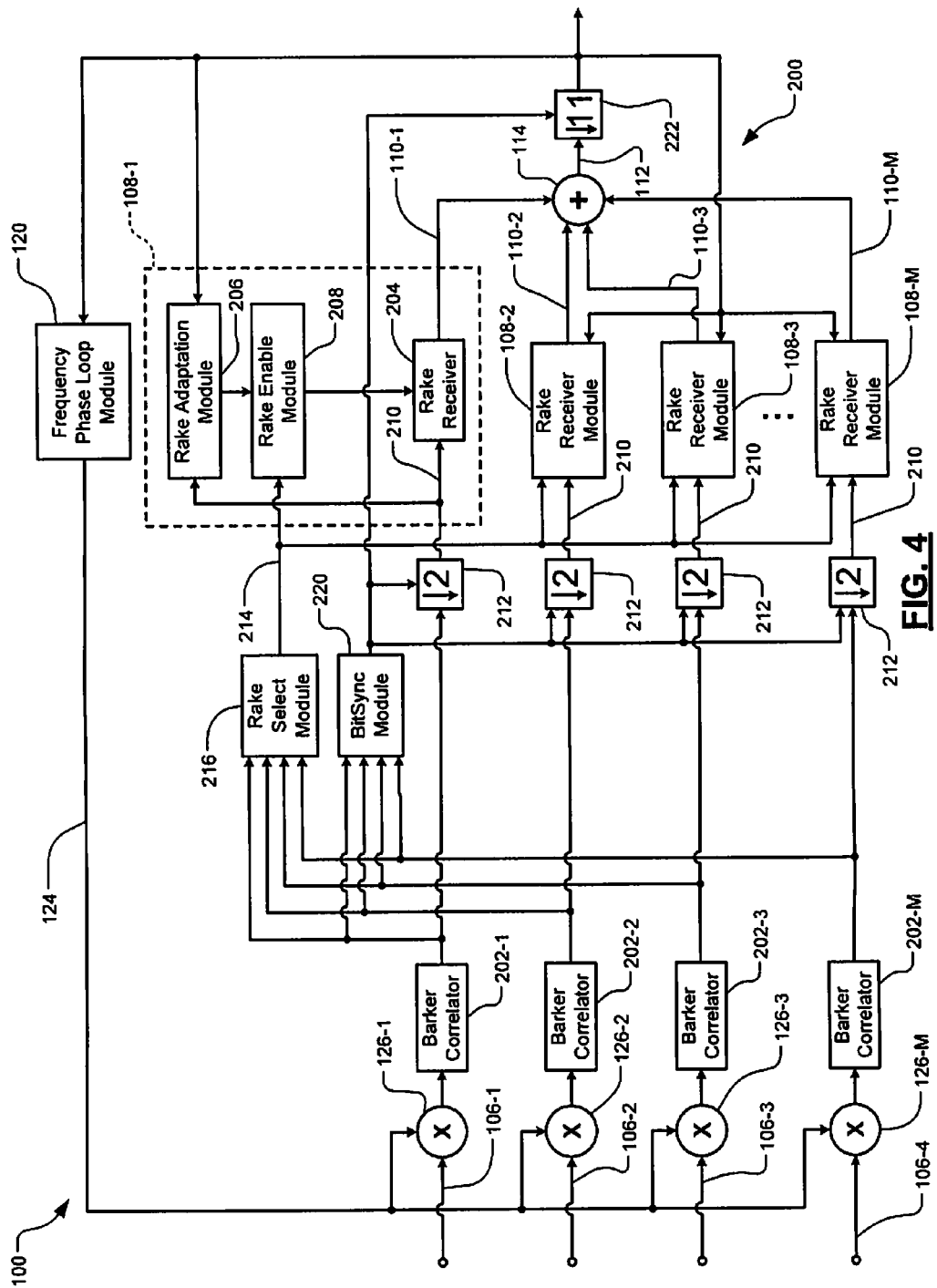
FIG. 4 is a functional block diagram of rake receiver module according to the present disclosure.

Referring now to FIG. 4, an intermediate portion 200 of the wireless receiver 100 is shown in more detail. Each of the rake receiver modules 108 communicates with a corresponding one of Barker correlators 202-1, 202-2, 202-3, . . . , and 202-M (referred to collectively as Barker correlators 202). Each of the Barker correlators 202 communicates with a respective one of the frequency correction multipliers 126 to decode the wireless signals 106.

Each of the rake receiver modules 108 includes a rake receiver 204, a rake adaptation module 206, and a rake enable module 208 as illustrated with respect to the rake receiver module 108-1. The rake receiver 204 receives a downsampled wireless signal 210 from a downsampler 212. The downsampler 212 reduces a sampling rate of a corresponding one of the wireless signals 106 by an integer factor (for example only, by a factor of 2). In the present implementation, the downsampler 212 reduces the sampling rate from 22 MHz to 11 MHz.

Figure 2:
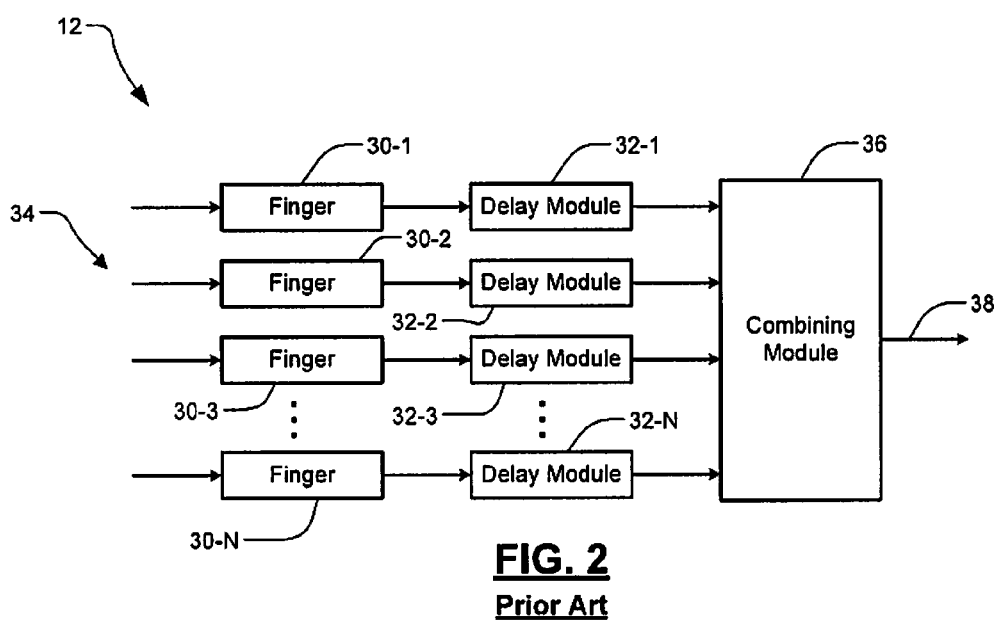
FIG. 2 is a functional block diagram of a rake receiver according to the prior art.

The rake adaptation module 206 determines rake combining coefficients of the rake receiver 204 based on the output signal 112 and the downsampled wireless signal 210. For example, the rake receiver 204 includes a plurality of the fingers 30 (as described above with respect to FIG. 2). The rake receiver 204 delays and combines the various multipath signals of each of the fingers 30 based on the rake combining coefficients. The rake adaptation module 206 adjusts the rake combining coefficients according to changes in the multipath signals.

The rake enable module 208 selectively enables and disables the fingers 30 of the rake receiver 204 based on a rake select signal 214. For example, the wireless receiver 100 includes multiple rake receiver modules 108. Consequently, the wireless receiver 100 receives and combines an increased number of the fingers 30. Each of the fingers 30 contributes noise. In particular, weaker ones of the fingers 30 tend to contribute a greater level of noise. The rake enable module 208 selectively disables the weaker ones of the fingers 30 to reduce noise.

The rake enable module 208 receives the rake select signal 214 from a rake select module 216. The rake select module 216 receives the wireless signal 106 and generates the rake select signal 214 accordingly. For example, the rake select module 216 may determine respective signal strengths of each of the fingers 30 of the wireless signal 106 and compare the signal strengths to a threshold. The rake select signal 214 indicates which of the fingers 30 have a signal strength that is greater than the threshold. The rake enable module 208 disables the fingers 30 that do not have a signal strength greater than the threshold.

The wireless receiver includes a bit synchronizing (bitsync) module 220. The bitsync module 220 receives the wireless signal 106 and determines sampling boundaries for a desired downsampling frequency. For example, the wireless receiver 100 may reduce the sampling rate from 22 MHz to 1 MHz. The downsampler 212 reduces the sampling rate from 22 MHz to 11 MHz. A downsampler 222 reduces the sampling rate from 11 MHz to 1 MHz. The bitsync module 220 determines the sampling boundaries based on outputs of the Barker correlators 202. For example, the bitsync module 220 determines the sampling boundaries based on a maximum magnitude of the outputs of the Barker correlators 202 (i.e. a maximum output of all of the Barker correlators 202).

Figure 5:
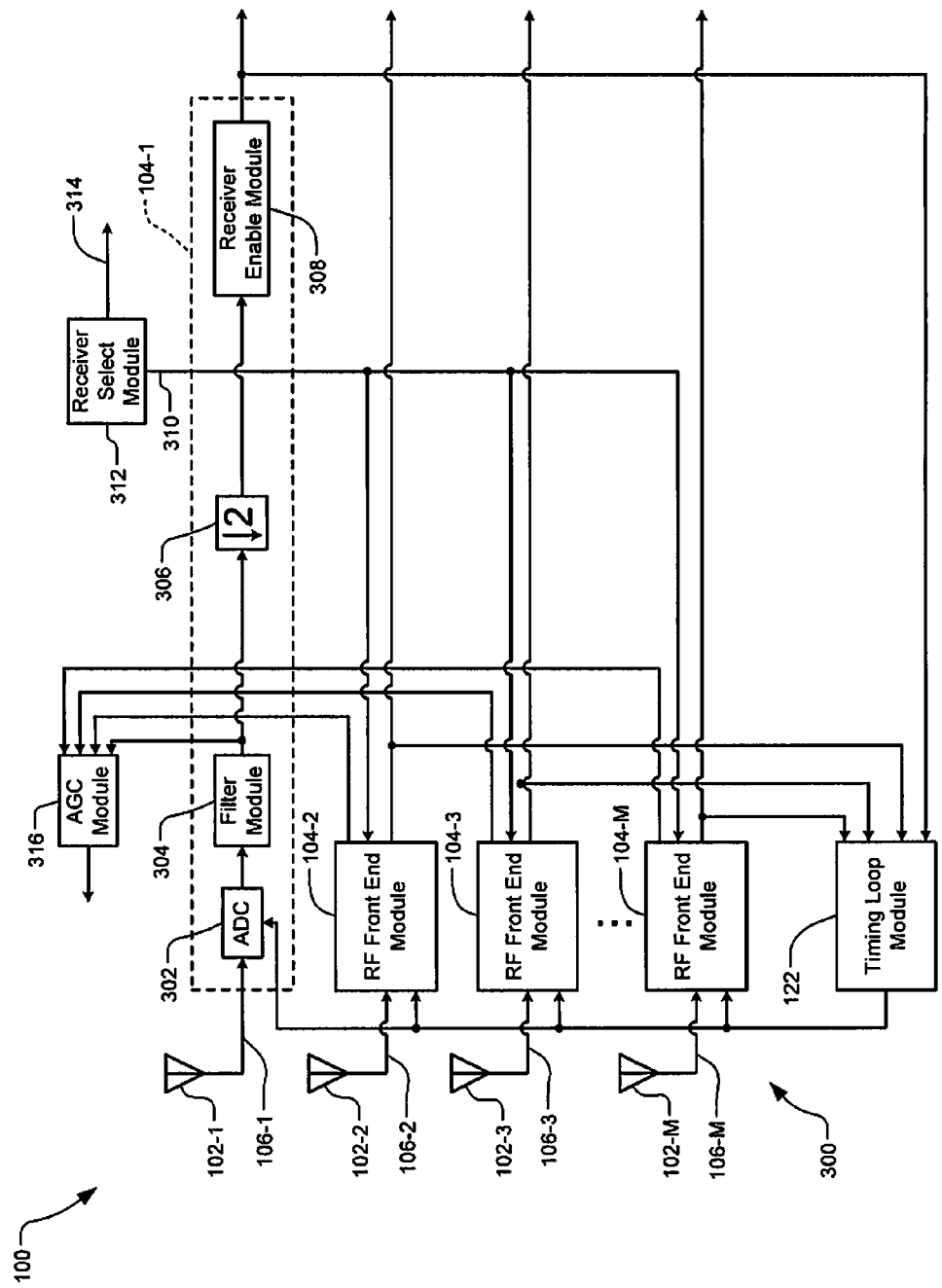
FIG. 5 is a functional block diagram of a front end portion of a wireless receiver according to the present disclosure.

Referring now to FIG. 5, a front end portion 300 of the wireless receiver 100 is shown in more detail. Each of the front end modules 104 includes an analog-to-digital converter (ADC) 302, a filter module 304, a downsampler 306, and a receiver enable module 308 as shown with respect to the front end module 104-1. The ADC 302 converts the received wireless signal 106-1 from an analog signal to a digital signal. The ADC 302 samples the wireless signal 106-1 based on feedback from the timing loop module 122. The filter module 304 filters the signal 106-1 according to a particular wireless communication protocol. For example only, the filter module 304 may include an IEEE standard 802.11b filter.

The receiver enable module 308 selectively enables and disables the receiver path corresponding to the signal 106-1. For example only, when the receiver 100 includes only 2 antennas (e.g. the antennas that receive the signals 106-1 and 106-2), additional receiver paths (e.g. the receiver paths corresponding to signals 106-3 through 106-M) may be unnecessary. The receiver enable module 308 disables any unnecessary receiver paths (e.g. forces the signal values of the receiver paths to zero).

The receiver enable module 308 operates according to a receiver select signal 310. The receiver enable module 308 receives the receiver select signal 310 from a receiver select module 312. The receiver select module 312 determines which receiver paths to enable and disable. For example only, the receiver select module 312 may automatically detect a number of antennas that are present and enable/disable receiver paths accordingly. In another implementation, a user and/or manufacturer calibrates the receiver select module 312 based on a known number of antennas.

The receiver select module 312 may generate one or more adjustment signals 314 based on the number of antennas and corresponding enabled receiver paths. The receiver select module 312 outputs the adjustment signals 314 to components of the receiver 100 that are sensitive to the number of enabled receiver paths. For example only, bandwidths of the frequency phase loop module 120 and the timing loop module 122 may vary based on the number of enabled receiver paths. Coefficients of the rake adaptation modules 108 may vary based on the number of enabled receiver paths.

The receiver 100 may include an adaptive gain control (AGC) module 316. The AGC module 316 adjusts gain of the receiver 100 based on the wireless signals 106.

Referring now to FIG. 6, the timing loop module 122 is shown in more detail. The timing loop module 122 includes zero-crossing error generation modules 400-1, 400-2, 400-3, . . . , and 400-M (referred to collectively as zero-crossing error generation modules 400), a timing loop 402, and a sample timing control module 404. Each of the zero-crossing error generation modules 400 receives a corresponding one of the wireless signals 106. The zero-crossing error generation modules 400 generate respective timing errors 406-1, 406-2, 406-3, . . . , and 406-M (referred to collectively as timing errors 406) based on the wireless signals 106.

A summing module 408 receives and combines the timing errors 406 and generates a timing error signal 410. The timing loop 402 receives the timing error signal 410 and generates a timing correction signal 412 based on the timing error signal 410. The sample timing control module 404 adjusts sample timing of the ADCs 302 of each of the front end modules 104 based on the timing correction signal 412.

Referring now to FIG. 7, a method 500 for operating a wireless receiver 100 having multiple receiver paths begins in step 502. In step 504, the receiver select module 312 determines a number M of the antennas 102 present in the wireless receiver 100. In step 506, the receiver select module 312 enables M of the antennas 102. In step 508, the receiver 100 receives wireless signals 106 via the M antennas 102. In step 510, M rake receiver modules 108 receive the wireless signals 106. In step 512, outputs of the M rake receiver modules 108 are spatially combined to increase the gain of the wireless receiver 100. The method 500 ends in step 514.

Referring now to FIGS. 8A-8G, various exemplary implementations incorporating the teachings of the present disclosure are shown.

Figure 8A:
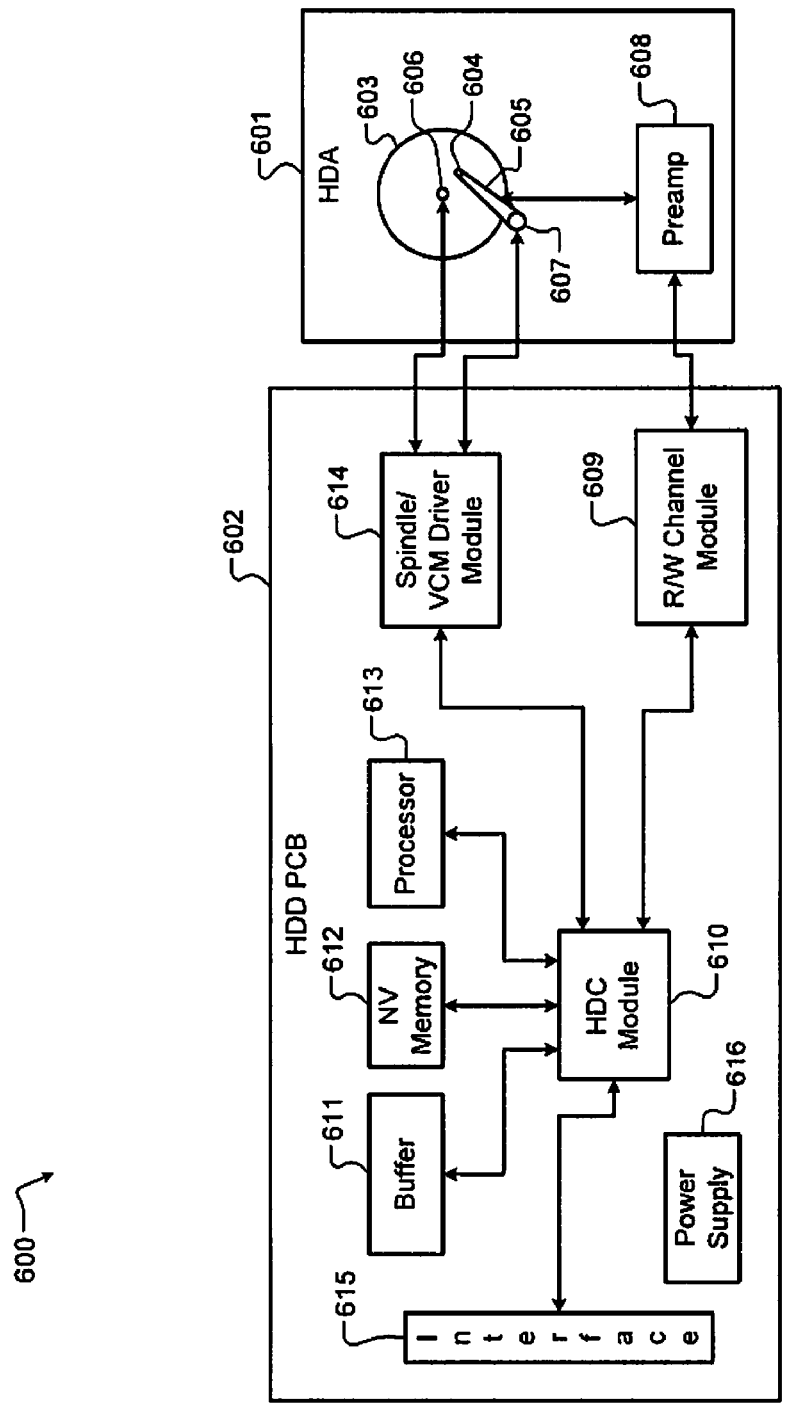
FIG. 8A is a functional block diagram of a hard disk drive.

Referring now to FIG. 8A, the teachings of the disclosure can be implemented in an I/O interface 615 of a hard disk drive (HDD) 600. For example, the I/O interface 615 may include a wireless receiver for receiving data. The HDD 600 includes a hard disk assembly (HDA) 601 and a HDD printed circuit board (PCB) 602. The HDA 601 may include a magnetic medium 603, such as one or more platters that store data, and a read/write device 604. The read/write device 604 may be arranged on an actuator arm 605 and may read and write data on the magnetic medium 603. Additionally, the HDA 601 includes a spindle motor 606 that rotates the magnetic medium 603 and a voice-coil motor (VCM) 607 that actuates the actuator arm 605. A preamplifier device 608 amplifies signals generated by the read/write device 604 during read operations and provides signals to the read/write device 604 during write operations.

The HDD PCB 602 includes a read/write channel module (hereinafter, "read channel") 609, a hard disk controller (HDC) module 610, a buffer 611, nonvolatile memory 612, a processor 613, and a spindle/VCM driver module 614. The read channel 609 processes data received from and transmitted to the preamplifier device 608. The HDC module 610 controls components of the HDA 601 and communicates with an external device (not shown) via the I/O interface 615. The external device may include a computer, a multimedia device, a mobile computing device, etc. The I/O interface 615 may include wireline and/or wireless communication links.

The HDC module 610 may receive data from the HDA 601, the read channel 609, the buffer 611, nonvolatile memory 612, the processor 613, the spindle/VCM driver module 614, and/or the I/O interface 615. The processor 613 may process the data, including encoding, decoding, filtering, and/or formatting. The processed data may be output to the HDA 601, the read channel 609, the buffer 611, nonvolatile memory 612, the processor 613, the spindle/VCM driver module 614, and/or the I/O interface 615.

The HDC module 610 may use the buffer 611 and/or nonvolatile memory 612 to store data related to the control and operation of the HDD 600. The buffer 611 may include DRAM, SDRAM, etc. The nonvolatile memory 612 may include flash memory (including NAND and NOR flash memory), phase change memory, magnetic RAM, or multi-state memory, in which each memory cell has more than two states. The spindle/VCM driver module 614 controls the spindle motor 606 and the VCM 607. The HDD PCB 602 includes a power supply 616 that provides power to the components of the HDD 600.

Figure 8B:
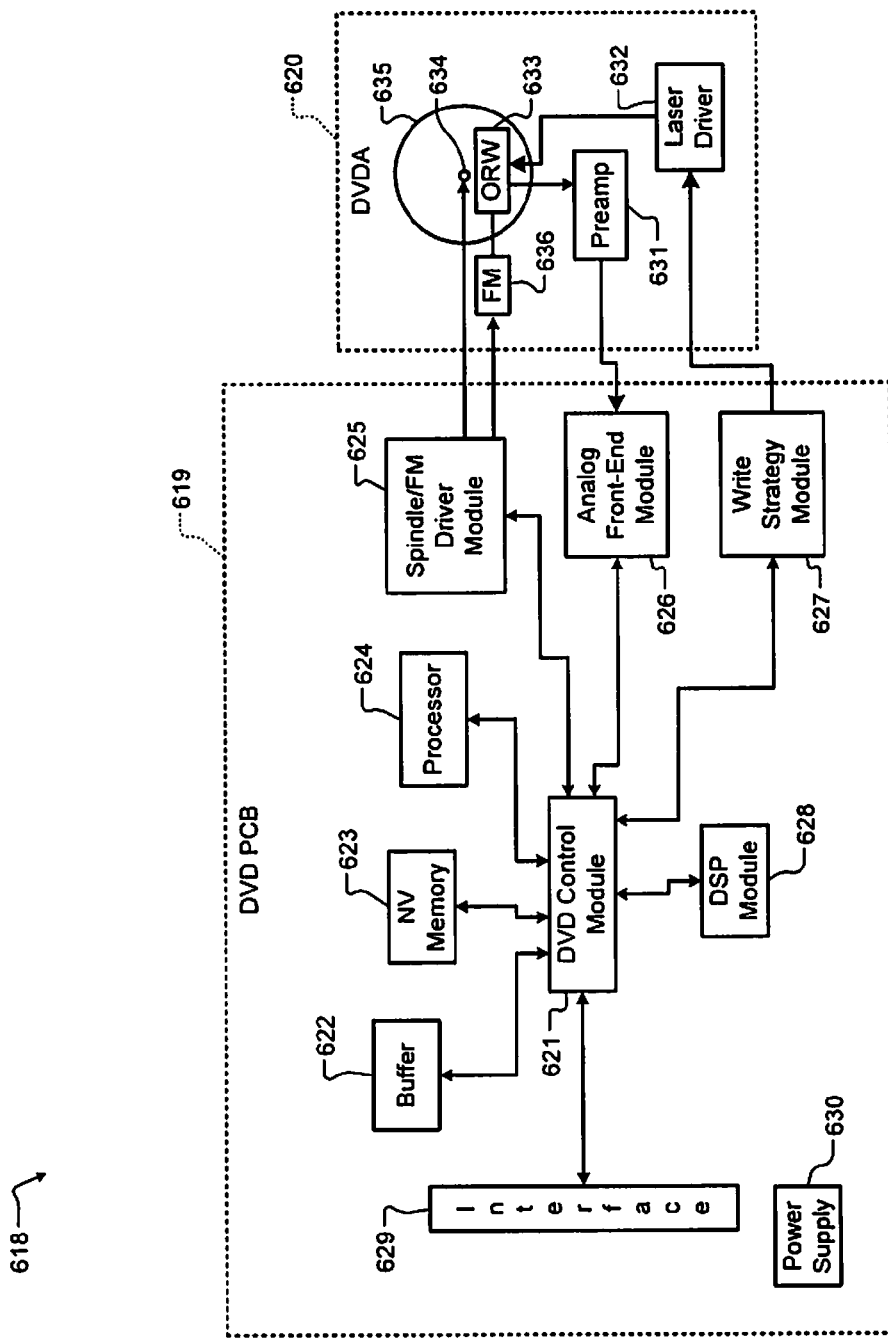
FIG. 8B is a functional block diagram of a DVD drive.

Referring now to FIG. 8B, the teachings of the disclosure can be implemented in an I/O interface 629 of a DVD drive 618 or of a CD drive (not shown). For example, the I/O interface 629 may include a wireless receiver for receiving data. The DVD drive 618 includes a DVD PCB 619 and a DVD assembly (DVDA) 620. The DVD PCB 619 includes a DVD control module 621, a buffer 622, nonvolatile memory 623, a processor 624, a spindle/FM (feed motor) driver module 625, an analog front-end module 626, a write strategy module 627, and a DSP module 628.

The DVD control module 621 controls components of the DVDA 620 and communicates with an external device (not shown) via the I/O interface 629. The external device may include a computer, a multimedia device, a mobile computing device, etc. The I/O interface 629 may include wireline and/or wireless communication links.

The DVD control module 621 may receive data from the buffer 622, nonvolatile memory 623, the processor 624, the spindle/FM driver module 625, the analog front-end module 626, the write strategy module 627, the DSP module 628, and/or the I/O interface 629. The processor 624 may process the data, including encoding, decoding, filtering, and/or formatting. The DSP module 628 performs signal processing, such as video and/or audio coding/decoding. The processed data may be output to the buffer 622, nonvolatile memory 623, the processor 624, the spindle/FM driver module 625, the analog front-end module 626, the write strategy module 627, the DSP module 628, and/or the I/O interface 629.

The DVD control module 621 may use the buffer 622 and/or nonvolatile memory 623 to store data related to the control and operation of the DVD drive 618. The buffer 622 may include DRAM, SDRAM, etc. The nonvolatile memory 623 may include flash memory (including NAND and NOR flash memory), phase change memory, magnetic RAM, or multi-state memory, in which each memory cell has more than two states. The DVD PCB 619 includes a power supply 630 that provides power to the components of the DVD drive 618.

The DVDA 620 may include a preamplifier device 631, a laser driver 632, and an optical device 633, which may be an optical read/write (ORW) device or an optical read-only (OR) device. A spindle motor 634 rotates an optical storage medium 635, and a feed motor 636 actuates the optical device 633 relative to the optical storage medium 635.

When reading data from the optical storage medium 635, the laser driver provides a read power to the optical device 633. The optical device 633 detects data from the optical storage medium 635, and transmits the data to the preamplifier device 631. The analog front-end module 626 receives data from the preamplifier device 631 and performs such functions as filtering and A/D conversion. To write to the optical storage medium 635, the write strategy module 627 transmits power level and timing data to the laser driver 632. The laser driver 632 controls the optical device 633 to write data to the optical storage medium 635.

Figure 8D:
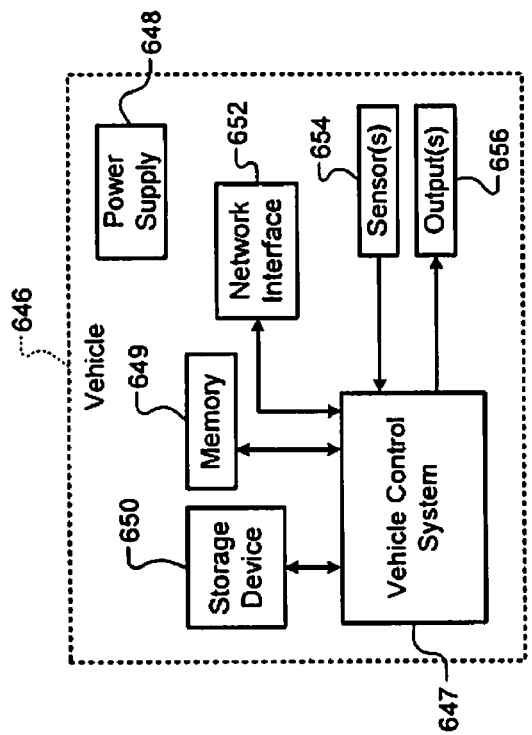
FIG. 8D is a functional block diagram of a vehicle control system.
Figure 8C:
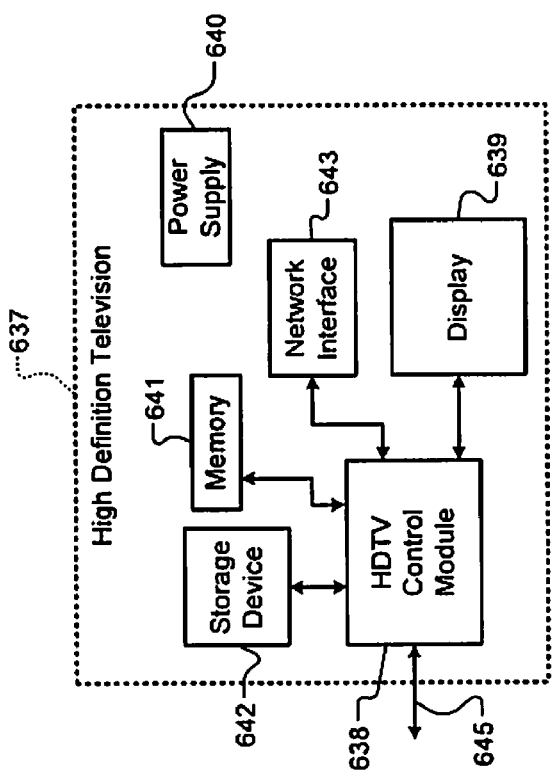
FIG. 8C is a functional block diagram of a high definition television.

Referring now to FIG. 8C, the teachings of the disclosure can be implemented in a network interface 643 of a high definition television (HDTV) 637. The HDTV 637 includes a HDTV control module 638, a display 639, a power supply 640, memory 641, a storage device 642, the network interface 643, and an external interface 645. If the network interface 643 includes a wireless local area network interface, an antenna (not shown) may be included.

The HDTV 637 can receive input signals from the network interface 643 and/or the external interface 645, which can send and receive data via cable, broadband Internet, and/or satellite. The HDTV control module 638 may process the input signals, including encoding, decoding, filtering, and/or formatting, and generate output signals. The output signals may be communicated to one or more of the display 639, memory 641, the storage device 642, the network interface 643, and the external interface 645.

Memory 641 may include random access memory (RAM) and/or nonvolatile memory such as flash memory, phase change memory, or multi-state memory, in which each memory cell has more than two states. The storage device 642 may include an optical storage drive, such as a DVD drive, and/or a hard disk drive (HDD). The HDTV control module 638 communicates externally via the network interface 643 and/or the external interface 645. The power supply 640 provides power to the components of the HDTV 637.

Referring now to FIG. 8D, the teachings of the disclosure may be implemented in a network interface 652 of a vehicle 646. The vehicle 646 may include a vehicle control system 647, a power supply 648, memory 649, a storage device 650, and the network interface 652. If the network interface 652 includes a wireless local area network interface, an antenna (not shown) may be included. The vehicle control system 647 may be a powertrain control system, a body control system, an entertainment control system, an anti-lock braking system (ABS), a navigation system, a telematics system, a lane departure system, an adaptive cruise control system, etc.

The vehicle control system 647 may communicate with one or more sensors 654 and generate one or more output signals 656. The sensors 654 may include temperature sensors, acceleration sensors, pressure sensors, rotational sensors, airflow sensors, etc. The output signals 656 may control engine operating parameters, transmission operating parameters, suspension parameters, etc.

The power supply 648 provides power to the components of the vehicle 646. The vehicle control system 647 may store data in memory 649 and/or the storage device 650. Memory 649 may include random access memory (RAM) and/or nonvolatile memory such as flash memory, phase change memory, or multi-state memory, in which each memory cell has more than two states. The storage device 650 may include an optical storage drive, such as a DVD drive, and/or a hard disk drive (HDD). The vehicle control system 647 may communicate externally using the network interface 652.

Figure 8F:
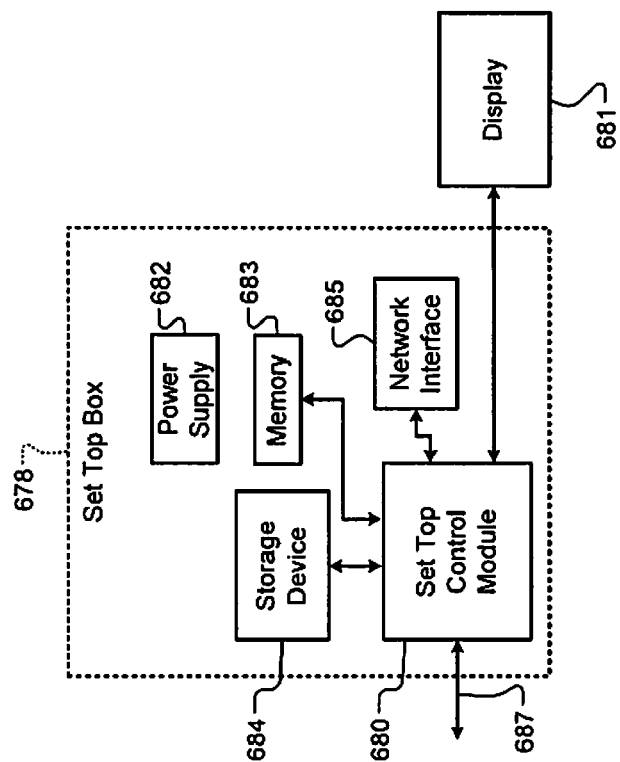
FIG. 8F is a functional block diagram of a set top box.
Figure 8E:
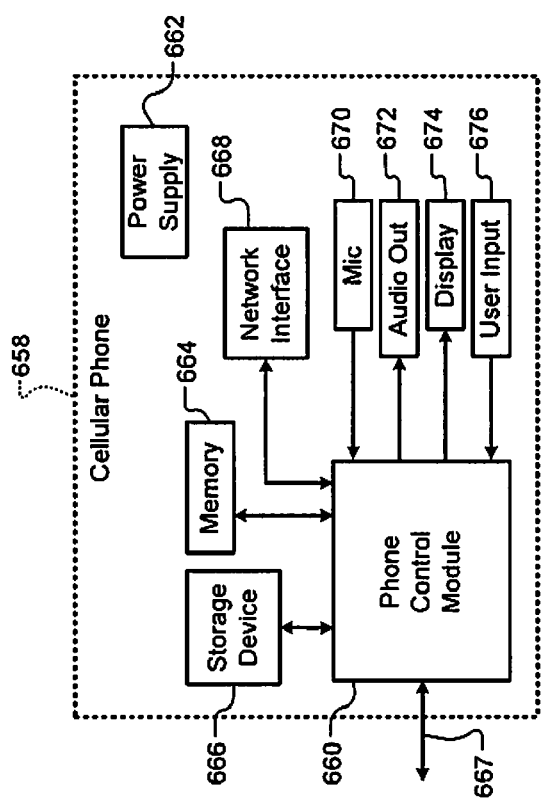
FIG. 8E is a functional block diagram of a cellular phone.

Referring now to FIG. 8E, the teachings of the disclosure can be implemented in a cellular phone network interface 667 and/or a network interface 668 of a cellular phone 658. The cellular phone 658 includes a phone control module 660, a power supply 662, memory 664, a storage device 666, and the cellular network interface 667. The cellular phone 658 may include the network interface 668, a microphone 670, an audio output 672 such as a speaker and/or output jack, a display 674, and a user input device 676 such as a keypad and/or pointing device. If the network interface 668 includes a wireless local area network interface, an antenna (not shown) may be included.

The phone control module 660 may receive input signals from the cellular network interface 667, the network interface 668, the microphone 670, and/or the user input device 676. The phone control module 660 may process signals, including encoding, decoding, filtering, and/or formatting, and generate output signals. The output signals may be communicated to one or more of memory 664, the storage device 666, the cellular network interface 667, the network interface 668, and the audio output 672.

Memory 664 may include random access memory (RAM) and/or nonvolatile memory such as flash memory, phase change memory, or multi-state memory, in which each memory cell has more than two states. The storage device 666 may include an optical storage drive, such as a DVD drive, and/or a hard disk drive (HDD). The power supply 662 provides power to the components of the cellular phone 658.

Referring now to FIG. 8F, the teachings of the disclosure can be implemented in a network interface 685 of a set top box 678. The set top box 678 includes a set top control module 680, a display 681, a power supply 682, memory 683, a storage device 684, and the network interface 685. If the network interface 685 includes a wireless local area network interface, an antenna (not shown) may be included.

The set top control module 680 may receive input signals from the network interface 685 and an external interface 687, which can send and receive data via cable, broadband Internet, and/or satellite. The set top control module 680 may process signals, including encoding, decoding, filtering, and/or formatting, and generate output signals. The output signals may include audio and/or video signals in standard and/or high definition formats. The output signals may be communicated to the network interface 685 and/or to the display 681. The display 681 may include a television, a projector, and/or a monitor.

The power supply 682 provides power to the components of the set top box 678. Memory 683 may include random access memory (RAM) and/or nonvolatile memory such as flash memory, phase change memory, or multi-state memory, in which each memory cell has more than two states. The storage device 684 may include an optical storage drive, such as a DVD drive, and/or a hard disk drive (HDD).

Figure 8G:
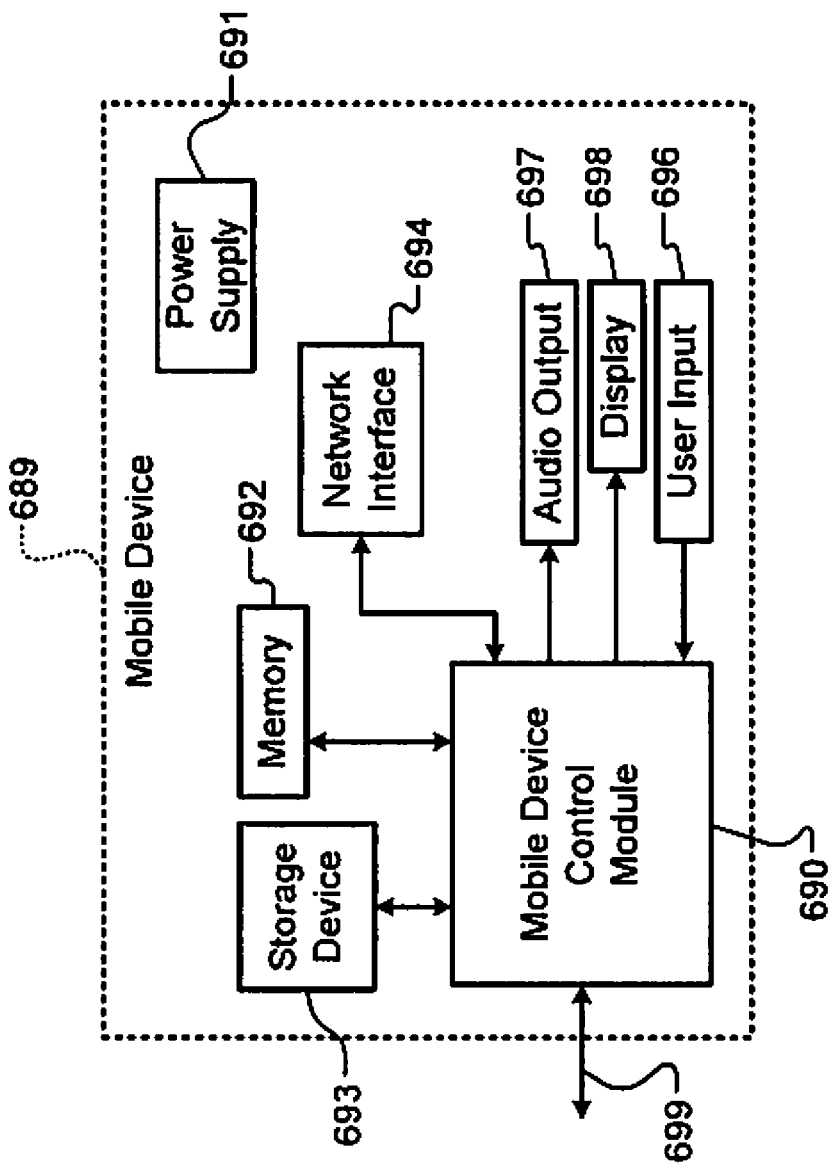
FIG. 8G is a functional block diagram of a mobile device.

Referring now to FIG. 8G, the teachings of the disclosure can be implemented in a network interface 694 of a mobile device 689. The mobile device 689 may include a mobile device control module 690, a power supply 691, memory 692, a storage device 693, the network interface 694, and an external interface 699. If the network interface 694 includes a wireless local area network interface, an antenna (not shown) may be included.

The mobile device control module 690 may receive input signals from the network interface 694 and/or the external interface 699. The external interface 699 may include USB, infrared, and/or Ethernet. The input signals may include compressed audio and/or video, and may be compliant with the MP3 format. Additionally, the mobile device control module 690 may receive input from a user input 696 such as a keypad, touchpad, or individual buttons. The mobile device control module 690 may process input signals, including encoding, decoding, filtering, and/or formatting, and generate output signals.

The mobile device control module 690 may output audio signals to an audio output 697 and video signals to a display 698. The audio output 697 may include a speaker and/or an output jack. The display 698 may present a graphical user interface, which may include menus, icons, etc. The power supply 691 provides power to the components of the mobile device 689. Memory 692 may include random access memory (RAM) and/or nonvolatile memory such as flash memory, phase change memory, or multi-state memory, in which each memory cell has more than two states. The storage device 693 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A wireless receiver comprising:
    M antennas configured to each receive a wireless signal;
    front end modules configured to each receive a respective one of the wireless signals;
    N rake receiver modules configured to receive the wireless signals from the M antennas,
    wherein the N rake receiver modules are configured to combine multipath components of the wireless signals;
    a summing module configured to receive outputs of the N rake receiver modules,
    wherein the summing module is configured to sum the outputs to generate an output signal; and
    a receiver select module configured to detect (i) a number of the M antennas or (ii) a number of enabled receiver paths and to generate a receiver select signal based on (i) the number of the M antennas or (ii) the number of the enabled receiver paths,
    wherein:
        M and N are integers greater than 1;
        each of the front end modules comprises a receiver enable module;
        the receiver enable modules are configured to receive the receiver select signal; and
        the receiver select module is configured to control the receiver enable modules to selectively disable an unnecessary receiver path based on the receiver select signal.

2. The wireless receiver of claim 1, wherein:
    each of the N rake receiver modules includes a rake adaptation module; and
    each of the rake adaptation modules is configured to determine rake combining coefficients of a corresponding one of the N rake receiver modules.

3. The wireless receiver of claim 1, wherein:
    each of the N rake receiver modules includes a rake enable module; and
    each of the rake enable modules is configured to selectively enable and disable fingers of a corresponding one of the N rake receiver modules based on signal strengths of the fingers.

4. The wireless receiver of claim 3, further comprising a rake select module configured to receive the wireless signals, compare signal strengths of the wireless signals to a threshold, and output a rake select signal based on the comparison.

5. The wireless receiver of claim 4, wherein the rake enable modules are configured to selectively enable and disable respective ones of the N rake receiver modules based on the rake select signal.

6. The wireless receiver of claim 1, further comprising a frequency phase loop module configured to determine a frequency offset based on the output signal.

7. The wireless receiver of claim 1, further comprising a timing loop module configured to determine a sampling frequency difference between the wireless receiver and a transmitter, wherein the transmitter is configured to transmit the wireless signals.

8. The wireless receiver of claim 7, wherein the timing loop module includes:
    N error generation modules configured to each generate a timing error based on a corresponding one of the wireless signals;
    a summing module configured to combine the timing errors to generate a timing error signal;
    a timing loop configured to generate a timing correction signal based on the timing error signal; and
    a sample timing control module configured to adjust sampling of the wireless signals based on the timing correction signal.

9. The wireless receiver of claim 1, wherein:
    the wireless receiver comprises N of the receiver enable modules; and
    the N receiver enable modules are configured to enable M receiver paths and disable N−M receiver paths when M<N.

10. The wireless receiver of claim 1, wherein the receiver select module is configured to generate an adjustment signal based on the number.

11. The wireless receiver of claim 1, wherein M=N.

12. The wireless receiver of claim 1, further comprising an adaptive gain control module configured to adjust a gain of the wireless receiver based on the wireless signals.

13. The wireless receiver of claim 1, wherein the receiver enable modules are configured to force signal values of the unnecessary receiver path to zero when disabling the unnecessary receiver path.

14. The wireless receiver of claim 1, wherein:
    the receiver select module is configured to generate an adjustment signal based on the at least one of the number of the M antennas or the number of the enabled receiver paths; and
    the adjustment signal is generated to disable the unnecessary receiver path.

15. The wireless receiver of claim 14, wherein the receiver select module is configured to output the adjustment signal to components, wherein the components are sensitive to a number of enabled receiver paths.

16. The wireless receiver of claim 14, further comprising at least one of a frequency phase loop module and a timing loop module,
    wherein bandwidth of the at least one of a frequency phase loop module and a timing loop module is adjusted based on the adjustment signal.

17. The wireless receiver of claim 14, wherein bandwidth of the N rake receiver modules is adjusted based on the adjustment signal.

18. The wireless receiver of claim 1, wherein the receiver select module is configured to:
    detect the number of the M antennas and the number of the enabled receiver paths; and generate the receiver select signal based on the number of the M antennas and the number of the enabled receiver paths.

19. The wireless receiver of claim 1, further comprising a downsampler configured to downsample the wireless signals to generate a downsampled wireless signal, wherein:
  each of the N rake receiver modules includes a rake adaptation module; and
  each of the rake adaptation modules is configured to determine rake combining coefficients of a corresponding one of the N rake receiver modules based on the output signal and the downsampled wireless signal.

20. The wireless receiver of claim 1, further comprising a rake select module configured to:
  receive the wireless signal;
  determine signal strengths of each finger of the wireless signal;
  compare the signal strengths to a threshold; and
  indicate a finger with a signal strength that is greater than the threshold,
  wherein the rake enable module is configured to disable fingers with signal strengths less than the threshold.

21. The wireless receiver of claim 1, further comprising a bit synchronizing module configured to receive one of the wireless signals and determine sampling boundaries for a downsampling frequency.

22. The wireless receiver of claim 21, further comprising a downsampler configured to reduce a sampling rate of the one of the wireless signals based on the downsampling frequency.

23. The wireless receiver of claim 21, further comprising a downsampler configured to reduce a sampling rate of the output signal of the summing module based on the downsampling frequency.

24. The wireless receiver of claim 16, wherein bandwidth of the frequency phase loop module is adjusted based on the at least one of the number of the M antennas or the number of the enabled receiver paths.

25. The wireless receiver of claim 1, wherein the unnecessary receiver path comprises one of the M antennas, one of the front end modules, and one of the N rake receiver modules.

26. A wireless receiver comprising:
  M antenna means, each for receiving a wireless signal;
  front end means, each for receiving a respective one of the wireless signals;
  N rake receiver means for receiving the wireless signals from the M antenna means, and for combining multipath components of the wireless signals;
  summing means for receiving outputs of the N rake receiver means and summing the outputs to generate an output signal; and
  a receiver select means for detecting (i) a number of the M antenna means or (ii) a number of enabled receiver paths and for generating a receiver select signal based on (i) the number of the M antenna means or (ii) the number of enabled receiver paths,
  wherein:
    M and N are integers greater than 1;
    each of the front end means comprising a receiver enable module;
    the receiver enable means receiving the receiver select signal; and
    the receiver select means controlling the receiver enable means to selectively disable an unnecessary receiver path based on the receiver select signal.

27. The wireless receiver of claim 26, wherein each of the N rake receiver means includes rake adaptation means for determining rake combining coefficients of a corresponding one of the N rake receiver means.

28. The wireless receiver of claim 26, wherein each of the N rake receiver means includes rake enable means for selectively enabling and disabling fingers of a corresponding one of the N rake receiver means based on signal strengths of the fingers.

29. The wireless receiver of claim 28, further comprising rake select means for receiving the wireless signals, for comparing signal strengths of the wireless signals to a threshold, and for outputting a rake select signal based on the comparison.

30. The wireless receiver of claim 29, wherein the rake enable means selectively enable and disable respective ones of the N rake receiver means based on the rake select signal.

31. The wireless receiver of claim 26, further comprising frequency phase loop means for determining a frequency offset based on the output signal.

32. The wireless receiver of claim 26, further comprising timing loop means for determining a sampling frequency difference between the wireless receiver and a transmitter, wherein the transmitter transmits the wireless signals.

33. The wireless receiver of claim 32, wherein the timing loop means includes:
  N error generation means, each for generating a timing error based on a corresponding one of the wireless signals;
  summing means for combining the timing errors to generate a timing error signal;
  timing loop means for generating a timing correction signal based on the timing error signal; and
  sample timing control means for adjusting sampling of the wireless signals based on the timing correction signal.

34. The wireless receiver of claim 26, wherein:
  the wireless receiver comprises N of the receiver enable modules; and
  the N receiver enable means enable M receiver paths and disable N−M receiver paths when M<N.

35. The wireless receiver of claim 26, wherein the receiver select means generates an adjustment signal based on the number.

36. The wireless receiver of claim 26, wherein M=N.

37. The wireless receiver of claim 26, further comprising adaptive gain control means for adjusting a gain of the wireless receiver based on the wireless signals.

38. A method for operating a wireless receiver comprising:
  receiving a wireless signal at each of M antennas;
  receiving a respective one of the wireless signals at each of a plurality of front end modules;
  receiving the wireless signals from the M antennas at each of N rake receiver modules;
  combining multipath components of the wireless signals at the N rake receiver modules;
  receiving outputs of the N rake receiver modules and summing the outputs to generate an output signal at a summing module;
  detecting (i) a number of the M antennas or (ii) a number of enabled receiver paths; and
  generating a receiver select signal based on (i) the number of the M antennas or (ii) the number of the enabled receiver paths,
  wherein:
    M and N are integers greater than 1;
    receiving the receiver select signal at receiver enable modules of the plurality of front end modules; and
    selectively disabling an unnecessary receiver path based on the receiver select signal.

39. The method of claim 38, further comprising determining rake combining coefficients of a corresponding one of the N rake receiver modules.

40. The method of claim 38, further comprising selectively enabling and disabling fingers of a corresponding one of the N rake receiver modules based on signal strengths of the fingers.

41. The method of claim 40, further comprising:
comparing signal strengths of the wireless signals to a threshold; and
outputting a rake select signal based on the comparison.

42. The method of claim 41, further comprising selectively enabling and disabling respective ones of the N rake receiver modules based on the rake select signal.

43. The method of claim 38, further comprising determining a frequency offset based on the output signal.

44. The method of claim 38, further comprising determining a sampling frequency difference between the wireless receiver and a transmitter that transmits the wireless signals.

45. The method of claim 44, further comprising:
generating timing errors based on corresponding ones of the wireless signals;
combining the timing errors to generate a timing error signal;
generating a timing correction signal based on the timing error signal; and
adjusting sampling of the wireless signals based on the timing correction signal.

46. The method of claim 38, further comprising:
providing N of the receiver enable modules; and
enabling M receiver paths and disabling N–M receiver paths when M<N.

47. The method of claim 38, further comprising generating an adjustment signal based on the number.

48. The method of claim 38, wherein M=N.

49. The method of claim 38, further comprising adjusting a gain of the wireless receiver based on the wireless signals.

* * * * *